United States Patent
Miyazaki et al.

(10) Patent No.: US 6,935,395 B2
(45) Date of Patent: Aug. 30, 2005

(54) PNEUMATIC TIRE WITH CARCASS PLY INCLUDING MAIN CORDS AND AUXILIARY CORDS

(75) Inventors: Shinichi Miyazaki, Kobe (JP); Osamu Toda, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 10/190,731

(22) Filed: Jul. 9, 2002

(65) Prior Publication Data

US 2003/0024623 A1 Feb. 6, 2003

(30) Foreign Application Priority Data

Jul. 10, 2001 (JP) ........................................ 2001-209664

(51) Int. Cl.[7] .............................. B60C 9/04; B60C 9/13
(52) U.S. Cl. ....................................... 152/557; 152/564
(58) Field of Search ................................ 152/557, 564

(56) References Cited

U.S. PATENT DOCUMENTS

| 2,986,191 | A | * | 5/1961 | Beckadolph | ............ | 152/557 X |
| 3,500,888 | A | * | 3/1970 | Boileau | ................... | 152/557 X |
| 3,783,926 | A | | 1/1974 | De Zarauz | | |
| 4,363,346 | A | | 12/1982 | Pepe | | |
| 4,657,058 | A | | 4/1987 | Kabe et al. | | |
| 5,971,049 | A | * | 10/1999 | Minami et al. | ......... | 152/564 X |

FOREIGN PATENT DOCUMENTS

| DE | 28 51 526 A1 | | 6/1980 | | |
| EP | 0 555 071 A1 | | 8/1993 | | |
| GB | 990392 | | 4/1965 | | |
| JP | 06115308 A | * | 4/1994 | .................. | 152/557 |

* cited by examiner

Primary Examiner—Adrienne C. Johnstone
(74) Attorney, Agent, or Firm—Birch, Stewart, Kolasch & Birch, LLP

(57) ABSTRACT

A pneumatic tire comprises a carcass ply of cords extending between bead portions through a tread portion and sidewall portions, the carcass cords include main cords for reinforcing purpose and auxiliary cords for controlling the outflow of topping rubber during vulcanization, the main cords and auxiliary cords are arranged alternately in the tire circumferential direction, and the number of auxiliary cord(s) between the main cords is in a range of from one to three.

8 Claims, 3 Drawing Sheets

Conventional Art

PNEUMATIC TIRE WITH CARCASS PLY INCLUDING MAIN CORDS AND AUXILIARY CORDS

The present invention relates to a pneumatic tire, more particularly to a carcass structure being capable of reducing the tire weight.

FIELD OF THE INVENTION

In recent years, in order to improve vehicles' fuel consumption, there is a strong demand for a lightweight tire. Therefore, in order to decrease the tire weight, an attempt to decrease the carcass weight was made by decreasing the cord count for the carcass ply. As well known in the art, a pneumatic tire is vulcanized in a mold while pressurizing the inside of the tire. Therefore, there is a tendency for the topping rubber of the innermost carcass ply to flow out through the carcass cords during vulcanizing the tire. Accordingly, if the carcass cord count is decreased in the innermost carcass ply, the outflow tendency of the topping rubber increases, and as shown in FIG. 5, the thickness of the topping rubber (g) covering the inside of the carcass cords is greatly decreased from (t') to (t). As a result, problems such as lowering of airtightness, cord corrosion, cord/rubber separation and the like arise, and the durability is liable to decrease.

BACKGROUND OF THE INVENTION

It is therefore, an object of the present invention to provide a pneumatic tire, in which the tire weight is reduced without deteriorating the durability.

SUMMARY OF THE INVENTION

According to the present invention, a pneumatic tire comprises
a tread portion,
a pair of sidewall portions,
a pair of bead portions,
a carcass ply of cords extending between the bead portions through the tread portion and sidewall portions,
the carcass cords including main cords for reinforcing purpose and auxiliary cords for controlling outflow of topping rubber during tire vulcanization,
the main cords and auxiliary cords arranged alternately in the tire circumferential direction, and
the number of auxiliary cord(s) between the main cords being in a range of from one to three.

Preferably, the gaps between the carcass cords are set in a range of from 0.02 to 0.80 mm.

Therefore, the strength necessary for the carcass ply is provided by the main cords, and the auxiliary cords hinder the outflow of the topping rubber which causes the topping rubber thickness decrease. Accordingly, the weight of the auxiliary cords can be minimized as far as they can prevent the outflow during vulcanizing the tire, and the total weight of the carcass cords and topping rubber can be minimized without deteriorating the durability.

BRIEF DESCRIPTION OF THE DRAWINGS

Embodiments of the present invention will now be described in detail in conjunction with the accompanying drawings.

DETAILED DESCRIPTION OF THE INVENTION

Figure 1:
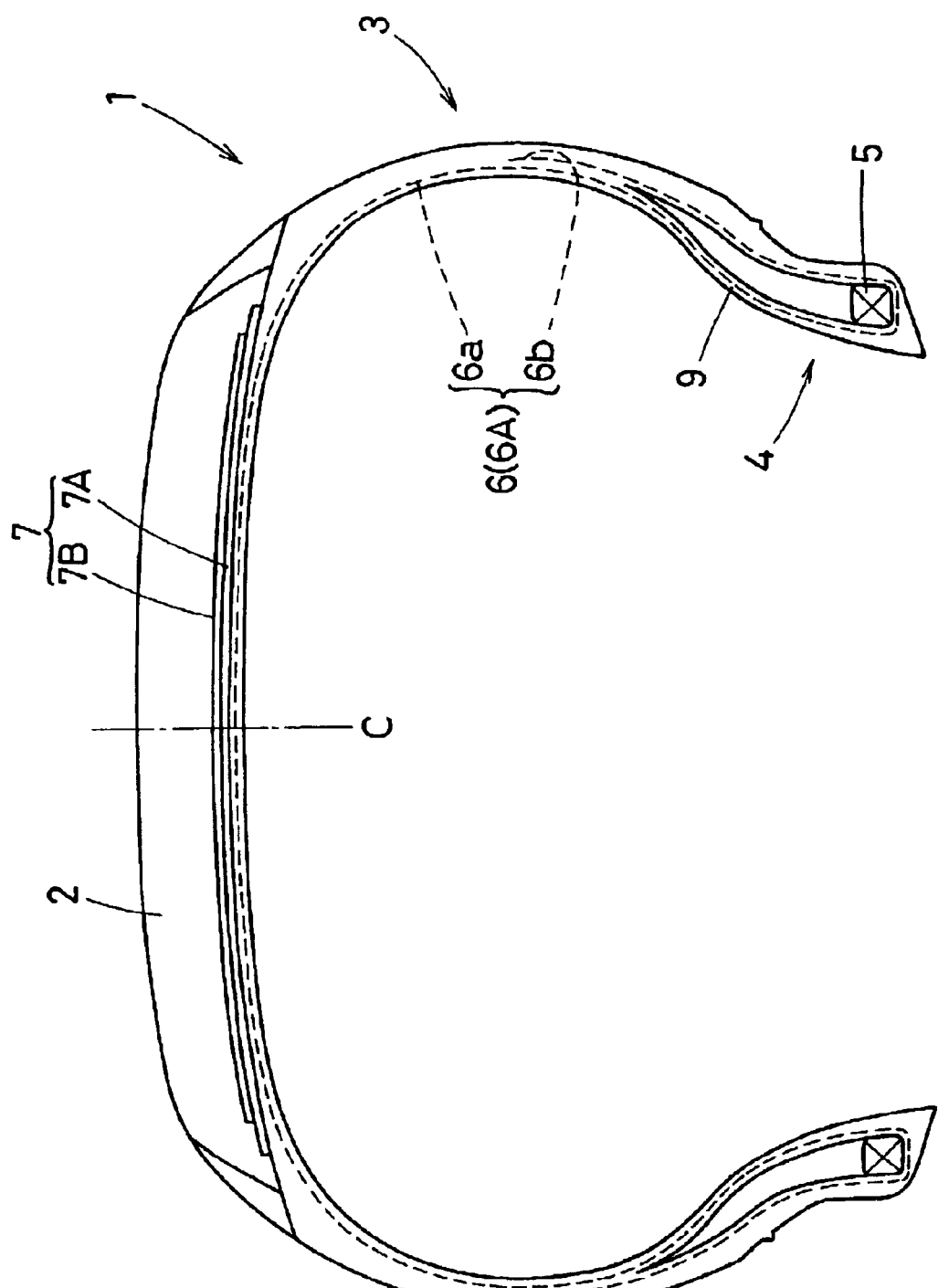
FIG. 1 is a cross sectional view of a pneumatic tire according to the present invention.

In the drawings, pneumatic tire 1 according to the present invention comprises a tread portion 2, a pair of sidewall portions 3, a pair of bead portions 4 each with a bead core 5 therein, a carcass 6 extending between the bead portions 4, and a belt 7 disposed radially outside the carcass 6 in the tread portion 2.

In the example shown in FIG. 1, the tire 1 is a radial tire for passenger cars.

The carcass 6 is composed of at least one ply 6A of carcass cords 10. The carcass cords 10 in the ply 6A are arranged radially at an angle of from 70 to 90 degrees with respect to the tire equator, and each extend between the bead portions 4 through the tread portion 2 and sidewall portions 3, and all is turned up around the bead core 5 in each bead portion 4 from the axially inside to the axially outside so as to form a pair of carcass ply turnup portions 6b and a carcass ply main portion 6a therebetween.

The carcass 6 in this example consists of the ply 6A and the cords 10 therein are arranged radially at 90 degrees with respect to the tire equator. And an inner liner 9 made of a gas-impermeable rubber is disposed along the inside of the carcass 6 to face the tire cavity. However, in order to further decrease the tire weight, the inner liner 9 can be omitted as explained later.

During building a raw tire, the carcass ply 6A is formed by applying a sheet of rubberized carcass cords 10 around the tire building drum. The carcass cords 10 in the sheet are laid parallel with each other. Each side of the sheet is covered with a topping rubber 12 (thickness t').

According to the present invention, the carcass cords 10 in the sheet include main cords 10M and auxiliary cords 10S which alternate in the longitudinal direction of the sheet. In the finished tire, accordingly, the main cords 10M and auxiliary cords 10S in the carcass ply 6A alternate in the circumferential direction of the tire. Between the adjacent main cords 10M, one to three auxiliary cords 10S are arranged.

Figure 2:
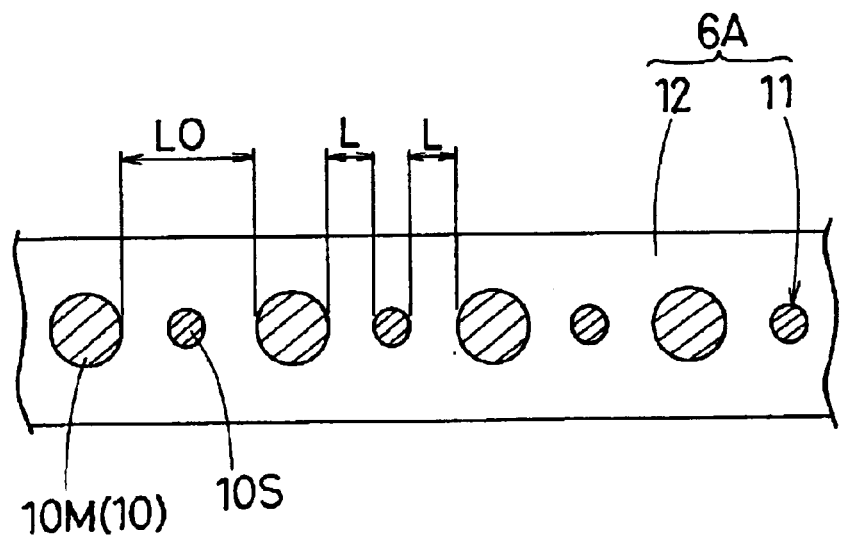
FIG. 2 is an enlarged schematic cross sectional view of a carcass ply showing an arrangement of main cords and auxiliary cords.
Figure 3:
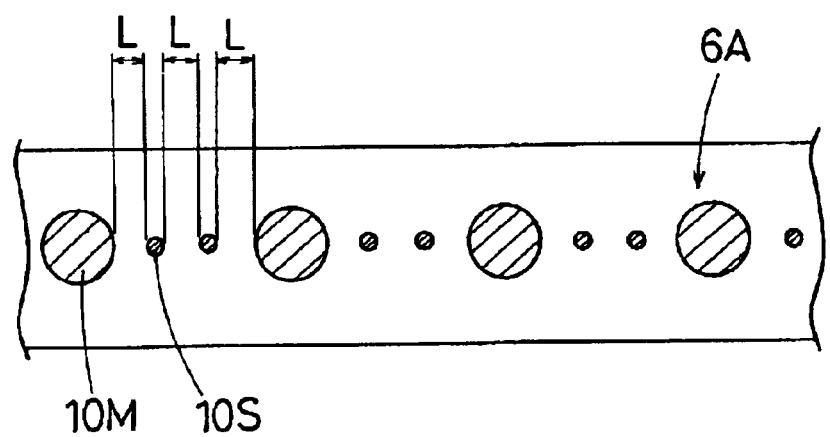
FIG. 3 is an enlarged schematic cross sectional view of a carcass ply showing another example of the arrangement of the main cords and auxiliary cords

FIG. 2 shows an example in which one auxiliary cord 10S is disposed between the main cords 10M.
FIG. 3 shows an example in which two auxiliary cords 10S are disposed between the main cords 10M.

The main cords 10M are for providing support to the tire inner pressure and tire load. In other words, the main function of the main cords 10M is to reinforce the carcass ply. On the other hand. the auxiliary cords 10s are for controlling the outflow of the topping rubber 12 during vulcanization.

In order to achieve a tire weight reduction while maintaining the strength necessary for the carcass ply, a high-strength, high-modulus cord is used as the main cords 10M and the cord count of the main cords 10M is decreased.

Given that a strength index is the product Tm×Km of the cord strength Tm (N) of the main cord 10M and the cord count Km of the main cords 10M per 5 cm ply width, usually, the strength index is set in a range of from 4,000 to 20,000 N/5 cm in case of passenger car tires, and in case of heavy duty tires for trucks and buses, the strength index is set in a range of from 15,000 to 100,000 N/5 cm. It is preferable that the cord strength Tm is not less than 140 (N) in case of a passenger car tire, and in case of heavy duty tire for trucks and buses, the cord strength Tm is not less than 800 (N).

Incidentally, the cord strength Tm may be increased by increasing the cord thickness Dm and/or using a material superior in the rupture strength.

Therefore, it becomes possible to minimize the strength of the auxiliary cord as far as the auxiliary cords can prevent the outflow of the topping rubber. Thus, the auxiliary cords may have a less strength and/or less thickness than the main cords. For example, in case of the passenger car tires in which organic fiber material, e.g. nylon, polyester, rayon and the like is conventionally used in the carcass cords, the strength can be increased by 1) increasing the cord thickness Dm, 2) using high-strength, high-modulus organic fiber material such as high-modulus polyethylene, high-modulus vinylon, aromatic polyamide, polyolefin ketone and the like, or steel fiber material, and/or 3) changing the cord structure. In case of the heavy duty tires in which steel cords are conventionally used as the carcass cords, the strength can be increased by 1) increasing the cord thickness Dm and/or 2) changing the cord construction.

As explained above, the main function of the auxiliary cords 10S is to control the outflow of rubber during vulcanization. Therefore, the cord strength Ts thereof can be decreased to under the cord strength Tm of the main cord 10M. Further, in view of the material cost and weight reduction, it is preferable that the product Ts×Ks of the cord strength Ts and the number Ks (=1, 2 or 3) of the auxiliary cord(s) 10S between the main cords 10M is set in a range of not more than 0.3 times, more preferably not more than 0.2 times, still more preferably not more than 0.15 times the cord strength Tm.

Incidentally, the cord strength Ts of the auxiliary cord 10s can be decreased by making the cord thickness Ds smaller than the main cords 10M and/or employing a material having a smaller rupture strength.

When the cord strength Ts is decreased by only decreasing the cord thickness Ds, it is preferable that the cord thickness Ds is set in a range of from 0.1 to 0.67 times, more preferably 0.1 to 0.4 times the cord thickness Dm of the main cords 10M. If the thickness Ds is more than 0.67 times the thickness Dm, the tire weight increases contrary to the purpose of the present invention. If the thickness Ds is less than 0.1 times the thickness Dm, it becomes difficult to control the outflow of the topping rubber.

Further, in order to effectively prevent the outflow of the topping rubber, the cord count of the carcass cords 10 (inclusive of 10M and 10S) is determined such that the gaps L therebetween are within a range of from 0.02 to 0.80 mm and substantially constant.

If the gaps L are more than 0.80 mm, the outflow is liable to occur. If the gaps L are less than 0.02 mm, fretting wear is liable to be caused between the adjacent cords and separation from the toping rubber tends to occur.

The above-mentioned inner liner 9 is made of air-impermeable rubber and extends over the tire inner surface facing the tire cavity with a substantially constant thickness. As the air-impermeable rubber, used is a butyl rubber compound including not less than 20 weight % of butyl rubber and/or halogenated butyl rubber as its base rubber material. A diene rubber can be used as the remaining part of the base rubber material, if any. In the air-impermeable rubber compound, a halogenide of isobutylene-paramethyl styrene copolymer can be also used instead of the butyl rubber and/or halogenated butyl rubber.

As mentioned before, in order to further reduce the tire weight, it is preferable that the air-impermeable rubber is used as the topping rubber 12 for the carcass ply 6A and the inner liner rubber 9 is omitted. In this case, it is possible that the air-impermeable rubber is used only in an inside part of the topping rubber facing the tire cavity, and in the outside part, a different rubber compound, e.g. diene rubber and the like is used.

The above-mentioned belt includes a breaker 7 and optional band disposed radially outside the breaker 7. The breaker 7 comprises at least two cross plies 7A and 7B of cords laid parallel with each other at an angle of from 10 to 35 degrees with respect to the tire equator. For the breaker cords, steel cords and high performance organic fiber cords such as aromatic polyamide and the like can be suitably used. In this example which is a passenger car radial tire, the belt 7 is composed of two cross breaker plies ply 7A and 7B. In case of heavy duty tire, the breaker 7 composed of three or four plies is usually used.

Comparison Tests

Radial tires having a tire size of 195/65R14 for passenger cars and a tire size of 11R22.5 for trucks and buses were made and tested as follows.

The test tires were disassembled, and the thickness of the carcass topping rubber covering the carcass cords was measured as the thickness t after the tire vulcanization and the thickness (t) is shown in Table 1 together with the thickness (t') before vulcanization.

Further, undulation of the carcass topping rubber due to the outflow during vulcanization was visually observed. According to the position of the boundary between the carcass topping rubber and inner liner rubber, the degree of undulation was ranked as follows.

A: The undulation was not observed.

Figure 4:
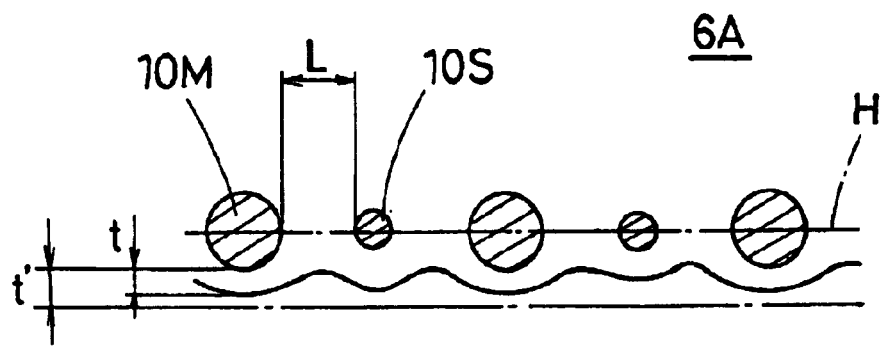
FIG. 4 is a diagram for explaining the function of the auxiliary cords.

B: The boundary did not run out beyond the inner ends of the cords as shown in FIG. 4.

C: The boundary ran out to a position between the inner ends of the cords and the cord center line H.

Figure 5:
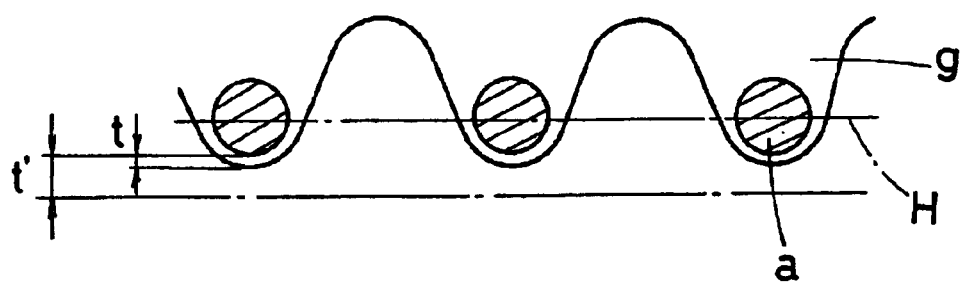
FIG. 5 is an enlarged schematic cross sectional view of a carcass ply used in reference tires in the undermentioned comparison tests.

D: The boundary ran out beyond the cord center line H as shown in FIG. 5.

The test results and the specifications of the carcass ply are shown in Table 1. The cord thickness and cord strength were measured according to Japanese Industrial Standard (JIS) L-1017 in case of organic fiber cords and JIS G-3510 in case of steel cords.

TABLE 1

| Tire | Ref. A | Ex. A | Ref. B | Ex. B |
|---|---|---|---|---|
| Tire size | 195/65R14 | 195/65R14 | 11R22.5 | 11R22.5 |
| Carcass ply | FIG. 5 | FIG. 2 | FIG. 5 | FIG. 3 |
| Main cord | 1100 dtex//2/2 | 1100 dtex//2/2 | 3 + 8 + 13 × 0.175 | 3 + 8 + 13 × 0.175 |
| Material | HM polyester | HM polyester | steel | steel |
| Strength Tm (N) | 280 | 280 | 1510 | 1510 |
| Thickness Dm (mm) | 0.78 | 0.78 | 1.05 | 1.05 |
| Count Km/5 cm | 45 | 45 | 26 | 26 |
| Tm × Km (N) | 12600 | 12600 | 39260 | 39260 |
| Auxiliary cord | — | 490 dtex | — | 1 × 3 × 0.175 |
| Material | — | 6-nylon | — | steel |
| Strength Ts (N) | — | 29 | — | 189 |
| Thickness Ds (mm) | — | 0.3 | — | 0.37 |
| Number Ks | — | 1 | — | 2 |
| (Ts × Ks)/Tm | — | 0.1 | — | 0.25 |
| Gap L (mm) | 0.7 | 0.02 | 0.87 | 0.24 |
| Ds/Dm | — | 0.38 | — | 0.35 |
| Undulation | C | A | D | B |
| Thickness |  |  |  |  |
| t (after) (mm) | 0.17 | 0.23 | 0.4 | 0.65 |
| t' (before) (mm) | 0.26 | 0.26 | 0.85 | 0.85 |

What is claimed is:

1. A pneumatic tire comprising a tread portion, a pair of sidewall portions, a pair of bead portions, a carcass ply of cords which extends between the bead portions through the tread portion and sidewall portions, the carcass cords including main cords for reinforcing purpose and auxiliary cords for controlling outflow of topping rubber during tire vulcanization, and the main and auxiliary cords both extending between the bead portions through the tread portion and sidewall portions, the main cords and auxiliary cords arranged alternately in the tire circumferential direction, the auxiliary cords having a thickness Ds in a range of from 0.1 to 0.67 times the thickness Dm of the main cords, and the number of auxiliary cord(s) between the main cords being in a range of from one to three.

2. A pneumatic tire comprising a tread portion, a pair of sidewall portions, a pair of bead portions, a carcass ply of cords which extends between the bead portions through the tread portion and sidewall portions, the carcass cords including main cords for reinforcing purpose and auxiliary cords for controlling outflow of topping rubber during tire vulcanization, the main cords and auxiliary cords arranged alternately in the tire circumferential direction, the auxiliary cords having a thickness Ds in a range of from 0.1 to 0.4 times the thickness Dm of the main cords, and the number of auxiliary cord(s) between the main cords being in a range of from one to three.

3. A pneumatic tire according to claim 1 or 2, wherein the gaps L between the carcass cords are in a range of from 0.02 to 0.80 mm.

4. A pneumatic tire, comprising a tread portion, a pair of sidewall portions, a pair of bead portions, a carcass ply of cords which extends between the bead portions through the tread portion and sidewall portions, the carcass cords including main cords for reinforcing purpose and auxiliary cords for controlling outflow of topping rubber during tire vulcanization, the main cords and auxiliary cords arranged alternately in the tire circumferential direction, the auxiliary cords having a thickness Ds in a range of from 0.1 to 0.67 times the thickness Dm of the main cords, and the number of auxiliary cord(s) between the main cords being in a range of from one to three, wherein the main cords are an organic cord having the thickness Dm, and the auxiliary cords are an organic cord having the thickness Ds.

5. A pneumatic tire, comprising a tread portion, a pair of sidewall portions, a pair of bead portions, a carcass ply of cords which extends between the bead portions through the tread portion and sidewall portions, the carcass cords including main cords for reinforcing purpose and auxiliary cords for controlling outflow of topping rubber during tire vulcanization, the main cords and auxiliary cords arranged alternately in the tire circumferential direction, the auxiliary cords having a thickness Ds in a range of from 0.1 to 0.67 times the thickness Dm of the main cords, and the number of auxiliary cord(s) between the main cords being in a range from one to three, wherein the main cords are a polyester cord having the thickness Dm, and the auxiliary cords are a nylon cord having the thickness Ds.

6. A pneumatic tire according to claim 1 or 2, wherein the main cords are a steel cord having the thickness Dm, and
the auxiliary cords are a steel cord having the thickness Ds.

7. A pneumatic tire, comprising
a tread portion,
a pair of sidewall portions,
a pair of bead portions,
a carcass ply of cords which extends between the bead portions through the tread portion and sidewall portions,
the carcass cords including main cords for reinforcing purpose and auxiliary cords for controlling outflow of topping rubber during tire vulcanization,
the main cords and auxiliary cords arranged alternately in the tire circumferential direction,
the auxiliary cords having a thickness Ds in a range of from 0.1 to 0.67 times the thickness Dm of the main cords, and
the number of auxiliary cord(s) between the main cords being in a range of from one to three, wherein
the main cords are a steel cord, and
the auxiliary cords are an organic cord.

8. A pneumatic tire according to claim 1 or 2, wherein an air-impermeable rubber compound is used as a topping rubber for the carcass ply.

* * * * *